Feb. 3, 1970         F. G. HUGHES         3,493,191
SAFETY BELT STRAP ANCHORING AND RETRACTION MECHANISM
Filed Sept. 5, 1967         2 Sheets-Sheet 1
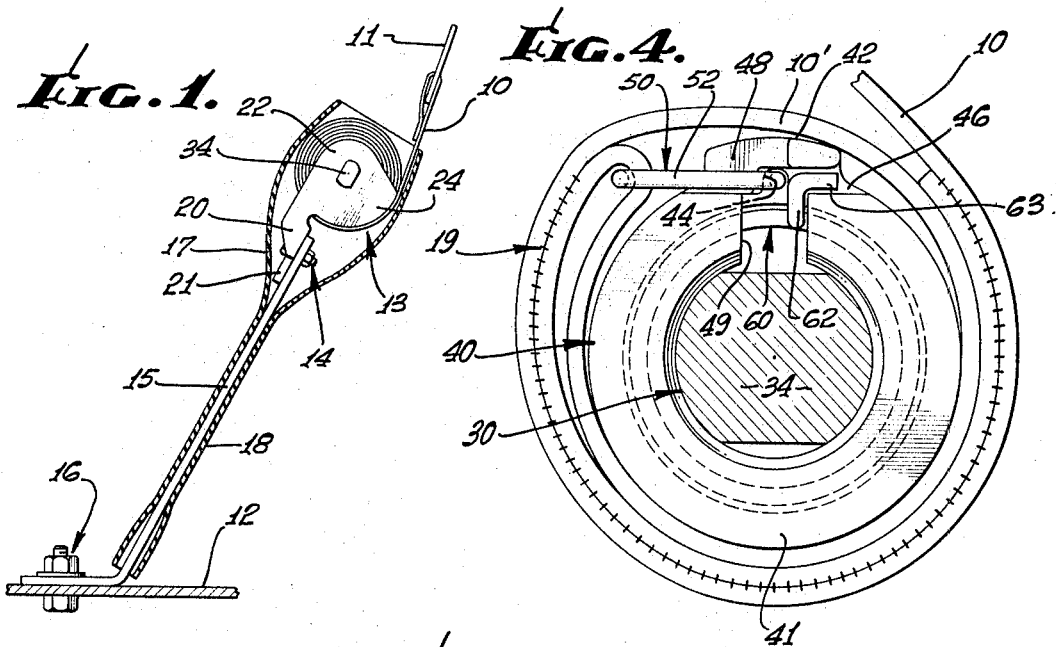
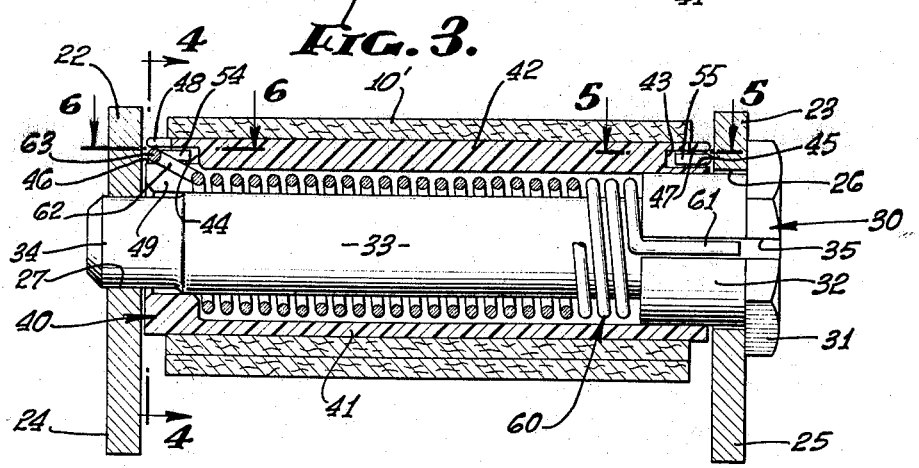
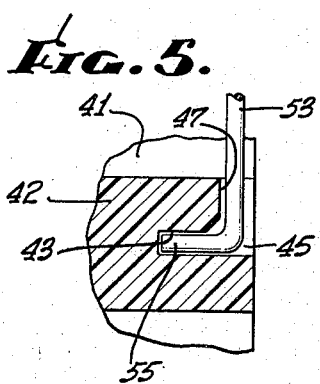
INVENTOR
FREDERICK G. HUGHES
By
Miketta, Glenny, Poms & Smith
ATTORNEYS.

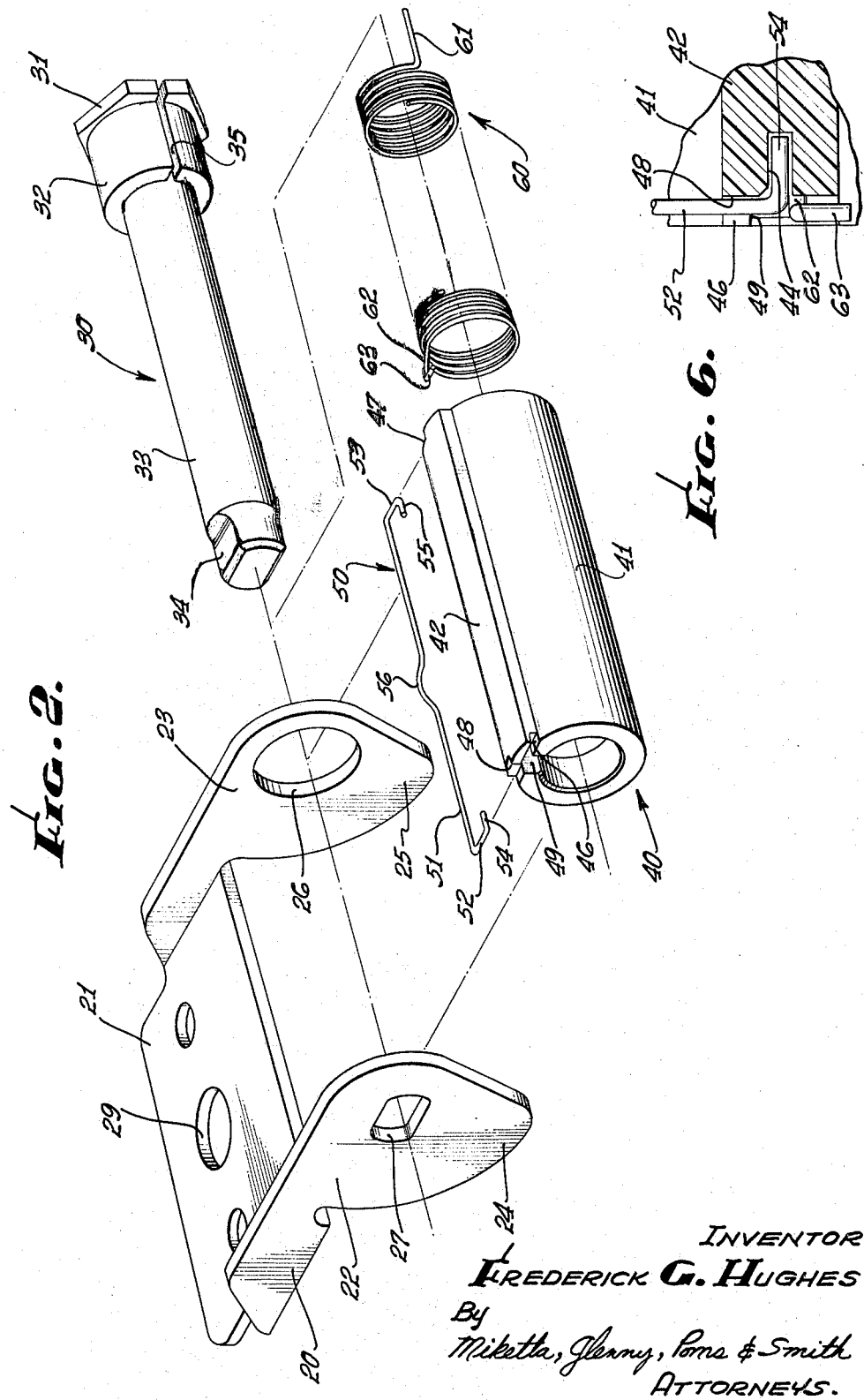

United States Patent Office 3,493,191
Patented Feb. 3, 1970

3,493,191
SAFETY BELT STRAP ANCHORING AND
RETRACTION MECHANISM
Frederick G. Hughes, Santa Ana, Calif., assignor to
American Safety Equipment Corp. of California, Sherman Oaks, Calif., a corporation of California
Filed Sept. 5, 1967, Ser. No. 665,467
Int. Cl. B65h 75/48
U.S. Cl. 242—107                             3 Claims

ABSTRACT OF THE DISCLOSURE

A spool rotatably mounted upon a shaft fixed between side flanges of a retraction mechanism frame mounted upon a metal strap or fitting secured to the vehicle frame. A torsion spring about the shaft and within the spool biasing the spool relative to the shaft and frame. A safety belt strap section looped and sewn about the spool and a wire or bail means pivotally mounted to the spool to entrain the strap section to wind or unwind with similar movement of the spool about the shaft. Embossed and slotted portions of a plastic spool pivotally mounting reentrantly folded terminal portions of a wire or bail means for entraining a strap section about the spool and which is of a longitudinal extent approximately equal to that of the spool. A spring end received in a slot provided in the spool and retained assembled thereto by a terminal portion of the bail means pivotally mounted to the spool.

Background of the invention

Automotive safety laws, particularly those presently being proposed and enacted by the Federal Government, have prescribed the mandatory installation of safety belt and harness restraint devices in ever increasing numbers in vehicles. This increased emphasis on the installation and hoped for use of safety restraint systems in automotive vehicles has created a demand for more easily and less expensively manufactured restraint systems which are capable of meeting ever increasing stringent standards of strength, durability and continuous, fail-safe performance. One aspect of every safety restraint system involves the anchoring and storing of the necessarily more involved, complex and increasing number of belt straps now being installed as original equipment in new automobiles adjacent, or to, front and rear passenger seat frames.

It is therefore a principal object of the present invention to disclose and provide a strong, durable and easily assembled and operated safety belt anchoring and retraction mechanism which can be readily mounted to a vehicle frame or structural member, or seat frame, in position for ready and inviting access and use by the vehicle passenger.

It is another object of the present invention to disclose and provide an inexpensively manufactured safety belt strap anchoring and retraction mechanism which is adapted to transfer strap loading through strong metal structural members of the mechanism during its safety restraint and anchoring functions while employing lighter, less expensive plastic and wire members in the construction and operation of the mechanism related to its non-loaded strap retraction and storing functions.

It is a further object of the present invention to disclose and provide a safety strap anchoring and retraction mechanism wherein a strap section looped about a spring wound spool is entrained thereto by a wire or bail means pivotally mounted to the spool in a non-load bearing relation to the strap. It is also an object to disclose and provide a mechanism as in the foregoing object wherein the wire or bail means cooperates with the spool, when assembled thereto, to retain the associated torsion spring means in operative engagement with the spool, and thereby facilitating the complete assembly of the spool, spring, strap and bail means to the structural portions of the retraction mechanism including the retraction device frame and main load bearing shaft.

Summary of the invention

Generally stated, the anchoring and retraction mechanism according to the present invention comprises the provision of a frame member to be secured to the vehicle frame or an appropriately structurally sound portion of the seat frame with a spool rotatably mounted about a shaft fixed to the mechanism frame. The frame and shaft members are made of suitable metal for load bearing purposes while the spool may be made of a lightweight plastic material. A torsion spring is provided about the shaft and within the spool for biasing the spool about the shaft into a wound up position. A safety belt strap section is looped about the spool, and preferably sewn adjacent such loop, so that strap loading is transmitted from the strap to the mechanism shaft through the spool. Failure of the spool material, though not expected, does not reduce the effectiveness or safety of the retraction mechanism since the strap loop encircles the strong frame shaft member.

A wire or bail means of relatively lightweight construction is pivotally mounted to the spool for entraining the strap section looped thereabout to cause the strap to be wound and unwound with rotation of the spool. Reentrantly folded terminal portions of the bail means, which may have an overall longitudinal extent generally equal to that of the spool, are pivotally received in embossed integral portions of the spool.

The spool is provided with slot means to receive an end portion of the torsion spring, an opposite end of the torsion spring engaging in an enlarged head portion of the mechanism shaft. As also contemplated within the present invention, the ease of assembly of the within mechanism is facilitated by the spool slot construction and means for mounting the bail means so that the end of the spring means engaged in the spool is retained in such engagement by a reentrantly folded terminal portion of the bail means pivoted to the spool. Thus, on assembly of the spool spring and strap section to the main shaft of the mechanism, the final assembly of the bail means thereto holds the spring and spool in assembled operative relationship.

The retraction mechanism frame is preferably mounted to a metal fitting extending upwardly from the vehicle floor or seat frame so that the retraction mechanism is secured at a convenient level above floor level ready for use. The retraction mechanism, floor fitting and associated parts may be enclosed by an appropriate plastic boot.

A more complete understanding of the safety belt strap anchoring and retraction mechanism will be afforded, and further objects and various advantages thereof will be apparent, to those skilled in the art from a consideration of the following detailed explanation of a preferred exemplary embodiment of a retraction mechanism according to the present invention. Reference will be made to the appended sheets of drawings in which:

FIG. 1 is a side elevational view, partially in section, of a preferred exemplary embodiment of the safety belt strap anchoring and retraction mechanism according to the present invention;

FIG. 2 is an enlarged exploded view of the preferred exemplary embodiment of the retraction mechanism in FIG. 1;

FIG. 3 is a transverse section view of the retraction mechanism of FIG. 1;

FIG. 4 is an end elevational view, partially in section, of the retraction mechanism of FIG. 3 taken therein along the plane 4—4;

FIG. 5 is a detail section view of a portion of the retraction mechanism of FIG. 3 taken therein along the plane 5—5; and FIG. 6 is a detail section view of the retraction mechanism of FIG. 3 taken therein along the plane 6—6.

Referring first to FIG. 1, a preferred exemplary embodiment of a safety belt strap anchoring and retraction mechanism is illustrated in use for retractably mounting and anchoring an otherwise conventional safety belt strap 10, having link or tongue plate 11, to a vehicle structural member 12 which may comprise a part of the vehicle frame, flooring or a strong structural portion of a vehicle seat secured to the vehicle frame. The exemplary retraction mechanism, illustrated generally at 13, is mounted by fastening means, as the nut and bolt indicated generally at 14, on a strong metal extension plate, fitting or standard 15 bolted at 16 to the vehicle structural member 12. The metal extension plate 15 is adapted to mount the anchoring and retraction mechanism, indicated generally at 13, spaced above the vehicle structural member 12 a suitable distance to allow positioning of the retraction mechanism adjacent the level of the top surfaces of the vehicle seat adjacent which the mechanism is to be installed.

A flexible or pliant plastic boot 17 may be provided, in known manner, to encase the retraction mechanism and its mounting or extension plate 15 as illustrated in FIG. 1. Because the anchoring and retraction mechanism, indicated generally at 13, is securely supported in position by the strong fitting or extension plate 15, the plastic boot 17 does not function to maintain the retraction mechanism elevated or raised above the vehicle floor or seat structural member as in certain prior retraction device assemblies. The narrow body portion 18 of the plastic boot therefore need not be particularly rigid to perform any load bearing function beyond merely covering and encasing the anchoring and retraction mechanism as illustrated.

Referring now to both FIGS. 1 and 2, it can be seen that the preferred exemplary embodiment of anchoring and retraction mechanism, according to the present invention, is provided with a frame 20 having a generally flat body plate 21 and a pair of spaced, generally parallel side flanges 22 and 23. Frame body plate 21 is ported or drilled at 29 to receive a bolt therethrough, as illustrated at 14 in FIG. 1, to mount the frame to extension plate or fitting 15. The side flanges 22 and 23 are enlarged to provide webbing guide portions 24 and 25, guide portion 24 being seen in FIG. 1, for guiding the winding of the webbing or strap 10 onto the retraction mechanism.

A main shaft, indicated generally at 30 in FIG. 2, is provided for rotatably mounting the spool and strap portions, as hereinafter explained, to the frame 20. Shaft 30, in the preferred exemplary embodiment, includes a hexagonal head 31, a large diameter shank portion 32, a smaller diameter shank portion 33 and a flattened end or tail portion 34. The large diameter shank portion 32 is provided wtih a slot 35 to receive and retain therein a portion of the torsion spring to be mounted about the shank and within the mechanism spool as hereinafter explained. As is apparent from FIG. 2, the shaft 30 is adapted to be non-rotatably mounted to frame 20 with the large diameter shank portion 32 received in aperture or port 26 in side flange 23 and with the flattened tail or end 34 secured within the mating, opposed flat-sided aperture or retaining port 27 in flange 22.

A preferably plastic, lightweight cylindrical spool is rotatably mounted about the mechanism shaft, indicated generally at 30, for winding and unwinding the webbing or safety belt strap 10 relative to the mechanism and its stationary frame 20 and main shaft 30. In the preferred exemplary embodiment, such plastic spool is indicated generally at 40 and is best seen in FIGS. 2 and 3. The exemplary spool is provided with a generally cylindrical body 41 having a longitudinally extending boss or longitudinally extending prominence 42 formed integrally with body 41. As best seen in FIG. 4, the safety belt strap or webbing 10 is looped about the body portion 41 of the spool and is sewn at 19 to be non-removably but rotatably mounted about the spool body and inner main shaft 30. The exemplary bail means, indicated generally at 50, entrains the strap or webbing 10 to cause it to wind or unwind with the rotation of the spool. The boss or prominence 42 functions in mounting the bail means, indicated generally at 50, as hereinafter explained and guides and elevates the single thickness of webbing 10' to compensate for the double or triple thickness of webbing at the sewn portion at 19 as seen in FIG. 4.

Bail means are provided, in accordance with the present invention, for entraining the strap section looped about the spool to cause the strap to be wound on the spool when the spool is rotated. In the preferred exemplary embodiment, such means includes a spring wire bail means, indicated generally at 50, comprising a spring or resilient wire having a body 51 and reentrantly folded or bent terminal or end portions 52 and 53 respectively. The reentrantly bent portions 52 and 53 thus provide wire portions 54 and 55 which are directed toward each other generally parallel to and spaced from the spring body 51 to be received in appropriately provided apertures or journals in the spool boss or prominence 42. As seen in FIGS. 5 and 6, the opposite ends of the boss or longitudinally extending prominence 42 formed integrally of spool body 41 is drilled or ported to provide journals 43 and 44 to receive and pivotally mount the wire ends 55 and 54 respectively. The opposite ends of boss 42 are slotted at 45 and 46 to receive ends 53 and 52 of the spring bail means therein, the spring body 51 being of the same longitudinal extent of the spool body 41 and boss 42. Cut out portions 47 and 48 in the upper portions of boss 42 allow the spring bail body 51 to pivot or move within a limited arcuate distance relative to the spool, the bail being pivotally mounted thereto by its terminal ends 54 and 55. On complete unwinding of strap 10 from the spool, indicated generally at 40, the spring wire bail means, indicated generally at 50, may be pivoted clockwise in FIG. 4 due to the pulling or raising of the strap portions beneath the bail means body 51.

Means are provided in the exemplary embodiment for biasing the exemplary spool into the fully wound position of FIG. 1. Such means include the provision of a torsion spring, indicated generally at 60, with a first longitudinally extending end or leg 61 adapted to be received in slot 35 provided in the enlarged diameter shank or shaft portion 32 of the shaft indicated generally at 30. As seen in FIG. 3, the torsion spring is adapted to be assembled about the main shaft shank portion 33 with the first leg or end 61 retained in slot 35. The opposite end of the torsion spring has a longitudinally extending and upwardly inclined second leg or end portion 62 having a right angle bent or laterally extending wire end portion 63 as seen in FIG. 2. As best seen in FIGS. 3 and 4, the spool body 41 is provided with a radial slot 49 to receive the upwardly inclined torsion spring leg 62 and the spool slot 46 extends traversely of the boss portion 42 to allow insertion of spring end 63 into spool slot 46. The spring portion 62 and its laterally extending end 63 are retained in the spool radial slot 49 and transverse boss slot 46, respectively, by the assembly of spring wire bail end 54 to the spool after the torsion spring has been assembled thereto.

The assembly of the safety belt strap anchoring and retraction mechanism, according to the present invention, preferably includes the steps of first assembling a strap loop about the plastic spool body 41 with the double thickness or sewn portion of the strap lying adjacent to and extending away from the boss 42 as seen in FIG. 4.

A torsion spring, indicated generally at 60, is then placed within the spool body 41 and the spring leg and end portions 62 and 63 are assembled into the spool slots 49 and 46 respectively. To the thus assembled strap spool and torsion spring means, the spring wire bail means, indicated generally at 50, is then assembled. The spring wire bail body 51 is preferably provided with an arcuate resilient portion 56 to allow springing of the bail body 51 onto the spool. End 54 may be first inserted into the journal or drilled hole 44 in spool boss 42 to retain the spring end 63 thereto, as seen in FIG. 6, and the body 51 sprung, flexing principally in section 56, to allow insertion of the opposite spring end 55 into the opposite journal or drilled hole 43 provided in the opposite end of the spool boss 42 as seen in FIG. 5. The bail is thus assembled over a portion of the strap loop to entrain the strap onto the spool as seen in FIG. 4.

The thus assembled strap, spool, spring and bail means is then positioned between side flanges 22 and 23 of frame 20 and the main shaft is inserted through the large opening 26 in flange 23 until the spring leg 61 is received in shaft slot 35. The shaft is then turned to load or subject the spring means to the desired torsion prior to seating the flattened end 34 of the main shaft into the retaining port 27 in side flange 22. End 34 may be retained in the retaining port 27 by a press fit, by use of a split ring retainer, cotter pin or other suitable fastening means. The mechanism thus assembled, may then be bolted to the extension plate 15, receive the plastic boot 17 and be assembled to the vehicle frame member 12 as shown in FIG. 1.

From the foregoing detailed explanation of a preferred exemplary embodiment of the safety belt strap anchoring and retraction mechanism, according to the present invention, it can be seen that the previously stated objects and desired advantages have been obtained by the mechanism of the present invention. Those skilled in the art should appreciate that the detailed explanation given herein is of a preferred exemplary embodiment and that other modifications and alternative embodiments thereof may be made which come within the scope of the present invention which is defined by and limited only by the following claims.

I claim:
1. In a retraction mechanism having a frame to be secured to a vehicle structural member and a shaft mounted by said frame, the improvement comprising:
   a spool rotatably mounted about said shaft;
   a torsion spring about said shaft and within said spool, said spring having one end held fixed to said shaft and an opposite end engaging said spool to bias said spool into a wound up position;
   a safety belt strap section looped about said spool; and
   a spring wire bail means including a body having a longitudinal extent no longer than that of said spool and being pivotally mounted to said spool for entraining said strap section looped about said spool to cause said strap to be wound on said spool when said spool is rotated, wherein
   said bail means includes a portion which retains said spring opposite end in engagement with said spool.

2. In a retraction mechanism including:
   a spool rotatably mounted about a shaft fixed between generally parallel side flanges of a supporting frame;
   a biasing means for biasing said spool against rotation about said shaft; and
   a safety belt strap section looped about said spool, the improvement comprising the provision of:
   a cross-bar with reentrantly bent terminal portions;
   means on said spool for pivotally mounting said cross-bar on said spool by said reentrantly bent terminal portions with said strap section being entrained under said cross-bar;
   wherein said biasing means includes a torsion spring; and
   said means on said spool for pivotally mounting said cross-bar also mounts one of said cross-bar terminal portions in an assembled position on said spool wherein one of said terminal portions retains an end of said torsion spring in assembled engagement with said spool.

3. The retraction mechanism of claim 2 wherein:
   said cross-bar has an effective longitudinal extent of an amount no greater than the longitudinal extent of said spool.

References Cited

UNITED STATES PATENTS

| | | |
|---|---|---|
| 821,265 | 5/1906 | Stephens. |
| 2,729,409 | 1/1956 | Hand _____ 242—74 X |
| 3,251,627 | 5/1966 | Fisher _____ 242—107 X |
| 3,301,503 | 1/1967 | Browning _____ 242—107 |
| 3,319,907 | 5/1967 | McAninch et al. __ 242—107.11 |
| 3,325,212 | 6/1967 | Dillender _____ 242—107.4 X |

FOREIGN PATENTS 26,751  10/1914  Great Britain.

STANLEY N. GILREATH, Primary Examiner